US011426827B2

(12) United States Patent
Garza, Jr.

(10) Patent No.: US 11,426,827 B2
(45) Date of Patent: Aug. 30, 2022

(54) MOBILE PIPE RESURFACING AND INSPECTION RACK

(71) Applicant: Ramiro Garza, Jr., Houston, TX (US)

(72) Inventor: Ramiro Garza, Jr., Houston, TX (US)

( * ) Notice: Subject to any disclaimer, the term of this patent is extended or adjusted under 35 U.S.C. 154(b) by 0 days.

(21) Appl. No.: 16/910,047

(22) Filed: Jun. 23, 2020

(65) Prior Publication Data

US 2021/0394315 A1 Dec. 23, 2021

(51) Int. Cl.
| | |
|---|---|
| *B23P 6/00* | (2006.01) |
| *B23P 6/04* | (2006.01) |
| *B23B 5/16* | (2006.01) |
| *B25H 1/16* | (2006.01) |
| *B25H 1/04* | (2006.01) |
| *B25B 1/20* | (2006.01) |

(52) U.S. Cl.
CPC ............... *B23P 6/04* (2013.01); *B23B 5/163* (2013.01); *B25B 1/20* (2013.01); *B25H 1/04* (2013.01); *B25H 1/16* (2013.01)

(58) Field of Classification Search
CPC ..... B23P 6/00; B23P 6/04; B23P 11/00; B23P 19/00; B23P 19/04
See application file for complete search history.

(56) References Cited

U.S. PATENT DOCUMENTS

| | | | | | |
|---|---|---|---|---|---|
| 4,229,121 | A | * | 10/1980 | Brown | B66C 17/00 15/104.04 |
| 4,820,101 | A | * | 4/1989 | Fenn | B65G 1/0442 177/147 |
| 5,673,843 | A | * | 10/1997 | Gainey | B23K 37/0533 228/44.5 |
| 6,371,637 | B1 | * | 4/2002 | Atchinson | F21V 19/005 362/249.04 |
| 8,695,958 | B2 | * | 4/2014 | Marrinan | G05B 19/4097 269/315 |

FOREIGN PATENT DOCUMENTS

CN 2013-F30770 * 5/2013 ............. B66C 19/00

* cited by examiner

*Primary Examiner* — Lee D Wilson
(74) *Attorney, Agent, or Firm* — The Law Offices of Kevin M. Jones & Associates, LLC

(57) ABSTRACT

A mobile pipe rack workstation for inspecting and repairing pipe materials, a "Pipe Station." By folding the pipe station's load/unload arms, removing any tool's from the tool mount and lowering the gantry by retracting the risers; the pipe station is transportable on public roadways without permitting, escorting, or special signage required for oversized loads.

19 Claims, 5 Drawing Sheets

MOBILE PIPE RESURFACING AND INSPECTION RACK

BACKGROUND OF THE INVENTION

Cross-Reference to Related Applications

Not Applicable.

Statement Regarding Federally Sponsored Research or Development

Not Applicable.

Reference to Sequence Listing, a Table, or a Computer Program Listing Compact Disc Appendix Not Applicable.

Field of the Invention

The invention relates generally to metal tube or pipe production. More particularly, the invention relates to the processing of metal tube or pipe production failing inspection (scrap) to process, repair, and reintroduce previously failed products as quality output.

The environment described here references the production of metal pipe (e.g. commonly used as "Line Pipe") for transportation of crude oil, petroleum products, natural gas, or water. In this environment the metallurgical specifications used worldwide are defined by the American Petroleum Institute (API), specifically API Specification 5L (API-5L), 5CT, 5A5, SDP, 5CRA, 5C1, etc.

The production of metal tube or pipe is controlled by standards defined for and applied according to the intended use of the final product. One skilled in the art would appreciate that the teachings herein may be applied to other environments controlled by other standards or specifications.

Background of the Invention

Metal pipe is used for transporting materials between facilities, through communities and across the country. Metal pipe must be durable and meet ridged specifications and regulations ensuring high strength and durability in order to withstand high pressures as it passes between communities and through neighborhoods.

Metal pipe, for purposes of the preferred embodiment, can range from approximately 2 inches to over 50 inches in diameter and can range in length from 4 feet to over 50 feet in length, and is referenced herein as "Line Pipe." One skilled in the arts should appreciate that application of these teachings is not limited to "Line Pipe." Other embodiments may accommodate the full range of pipe diameters, from 2 inches to 80 inches, and lengths which are compliant with current industry standards (e.g. API-5L, et al.).

Line pipe can include seamless or welded metal pipes. Metal pipes may be made of, for example, carbon steel, stainless-steel, and/or alloy metals. The grades/alloys are determined by customer preference, desired characteristics, and/or intended uses. The size and diameter required for a pipeline can vary based on the amount of fluids the pipe is intended to carry as well as the pressures that the pipe must withstand. The thickness requirements for line pipe are determined by the maximum operating pressure required for a pipeline and is based on published standards and federal regulations to prevent dangerous or hazardous situations.

Production of line pipe begins with feeding a furnace iron ore and/or scrap material along with alloying elements to produce billets. The billets are then pierced, rolled, and sized before undergoing nondestructive testing. Electro Magnetic Imaging (EMI) is used to locate defects such as plate lamination discontinuity.

All metals contain discontinuities at micro and macro levels. Plate lamination defect are flat and thin subsurface separations parallel to the surface caused by porosity or inclusions and drastically reduce the strength of the metal. Failed billets are used for machining processes or sent back through the furnace as scrap materials to be reformed.

Billets passing inspection are then forged, sized, tempered, and straightened into pipe stock. The pipe stock is then inspected again with EMI, ultrasonic scanning, X-ray imaging, chemical dissolution, and/or Magnetic Particle Inspection (MPI). Inspection looks again for lamination discontinuity that was subsequently exacerbated with continued milling/forging, was previously unidentified, etc.

Pipe stock passing inspection continues to various finishing lines to get coupling, threading, and optional phosphating resulting in final-formed joints of pipe. The raw pipe joints then undergo drift testing and hydrostatic testing prior to being directed to various finish lines according to customer requirements.

Finishing may be on-site or could require application of temporary protective coatings prior to shipment to finishing facilities. Application of temporary protective coatings involves preheat, shot blasting or other cleaning before application of rust inhibitors.

Final finishing requires removal of any temporary protective coatings to allow for a final bare pipe inspection. Finishing facilities may also conduct one or more previous inspection processes according to regulatory or consumer/customer requirements. Coating can be simple solvent-borne, water-borne, or UV-curing spray coatings, or complex multi-layer application processes.

An exemplary anti-rust protection process involves induction heating, spray application of fusion body epoxy, wrapped with copolymer adhesive sheets, covered by a layer of polyethylene which is water quenched for cooling. After application, the coating material must be tested to ensure anti-rust protection of the pipe.

Holiday testing (AKA Jeep testing due to the sounds emitted) pass steady or pulsing high voltage probes along the coating surfaces looking for conduction through the coatings and along the pipe. It can also identify issues such as lamination, occlusions, gauge fluctuations, etc. in the underlying metal.

At each stage of production, materials which fail inspection becomes more costly to the operation. In initial stages, failed billets could easily be recycled to the furnace with little financial or time loss. Early pipe production may be cut, swaged, and re-tempered in efforts to reintroduce the material into the production line.

Once coupling, threading, and finishing processes are performed, the resource loss of scrapping failed materials is too costly. But recycling material back through the furnace is always an option of last resort. Materials failing test are referenced herein as recycle.

Recycling may include repair and reintroduction of materials back into processing. Recycling may include repair and finishing materials for release as final product. Recycling may include diversion of materials to other uses, or stripping/cleaning and/or returning material to the furnace for recasting.

As the production process progresses, sunk cost in each production unit increases, and the expertise, time, and/or other resources to repair the failed production unit becomes greater. This makes it more costly to reintroduce failed material back into the production line. The sunk cost in each production unit also makes it costly to write off the failed units. The wide variety of options from one production run to the next may make it difficult to dedicate facilities, labor, and equipment to such recovery efforts.

One of the most difficult jobs in metal fabrication is using portable tools to remediate imperfections and produce a final finish on metal pipes. For example, grinding an imperfection on tubular pieces, removing excess stock from the weld to achieve a level and continuous surface blending with the parent metal without creating noticeable flat spots can be a daunting task. The training and dedication of a full crew of skilled workers (10-15) to accomplish the task in a reasonable amount of time does not make financial sense in all but the largest production facility.

The actions to correct defects and return a particular unit to the production line depends on the test causing rejection and where it occurred in the production process. Examples include but are not limited to the following.

Pitting which reduces the wall thickness below acceptable thickness in a localized area which may be remedied by over welding the area. If detected and repaired prior to entering finishing, the repaired pipe may be returned to the production line to continue through production. Imperfections like pitting, weld splatter, slivers, etc., not detected until after finishing, requires partial removal of finish coatings to expose the defect and surrounding area prior to repairs.

Another example may be detection of a holiday from conducting a jeep test resulting from an insufficient spray when applying layers of epoxy or adhesive, or a puncture in the wrapping of a copolymer adhesive sheet. These would require removing coatings at the area of the defect prior to inspecting and cleaning the pipe surface.

If the entire pipe section is stripped down to the metal, then the section may be inserted into the finishing process for a full recoating. Otherwise, the finish coatings must be restored by manually applying patches or recoating the portion of exposed pipe. Either of which cannot be accomplished by passing the section back into the production process at any point.

DETAILED DESCRIPTION OF THE PREFERRED EMBODIMENTS

Figure 1:
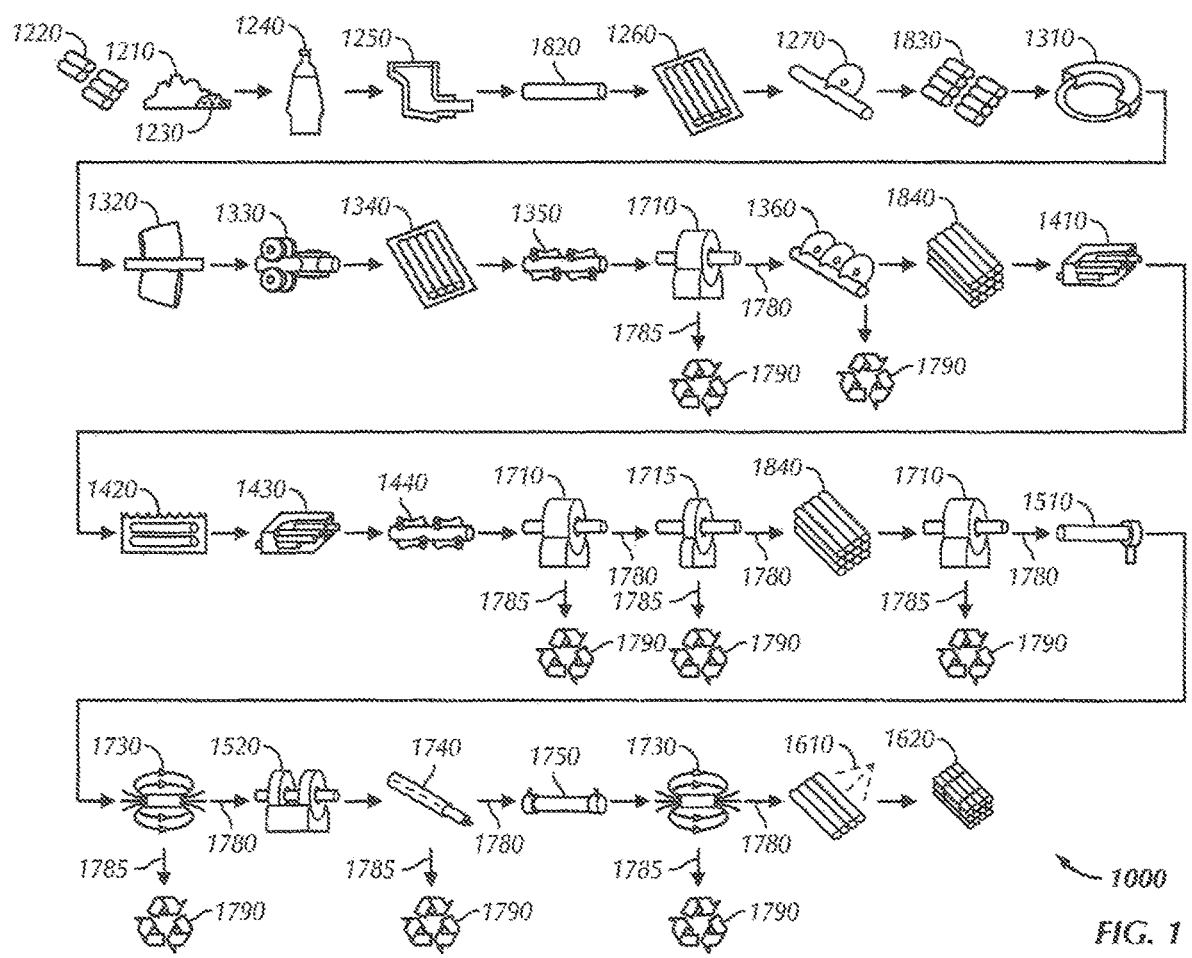
FIG. 1 illustrates the flow of line pipe production process.

The innovation described herein is a pipe rack configured for use as a resurfacing and inspection workstation which is referenced herein as a "pipe station." As the collection of rejected materials (designated as recycle) increases, it becomes more feasible to have trained workers able to correct defects and return the units to become final product.

But if a manufacturing facility is maintained, efficient, and operating smoothly, there may not be sufficient recycle material. The innovation described here also has features to make it portable. This allows a trained team to travel between various mills, finishing facilities, and even end user sites to perform the necessary work to rehabilitate any rejected or damaged materials up to the level of final product standards.

The preferred embodiment of the pipe station can rework material from four feet to fifty feet in length, with diameters ranging from approximately two and a half inches to greater than thirty inches in diameter. Risers at each end support an overhead gantry running the length of the pipe station. The risers adjust in height by nesting or telescoping to allow the gantry to move from a working or overhead position to a lowered storage or shipping position.

In the overhead position, the gantry supports a tool mount generally above work materials and slidable along the length of the pipe station. The gantry can be lowered to a storage position to be compact in size allowing transport along most roadways without special permitting, signage and escorting, or other transportation requirements/restrictions.

The deck of the pipe station has two parallel axles with rollers. These rollers may be composed of metal, plastic, rubber, or other materials. Urethane rollers are utilized in the preferred embodiment to protect stainless-steel products, which may be damaged by metal rollers. Jack stands can assist in loading and unloading the pipe station as well as leveling it on most surfaces. The gantry may be manually raised and lowered or may be mechanized. The tool rack on the gantry may also be manually moved from side to side, or mechanized.

Loading arms, load on one side and unload on the opposite side, allow for continuous workflow into and out of the pipe station as a pipe is completed. One skilled in the art would appreciate that a single set of arms may be used on a single side for loading and unloading operations. But this would require a finished pipe unit to be removed from the pipe station and moved away before the next pipe unit could be moved in and loaded. This inability to pre-stage would slow the process and limit operation productivity.

In the preferred embodiment a belt sander on the tool mount is adjustable to apply a controlled pressure to the work material and is moved side to side by an operator through a control panel located at one end of the pipe station. The control panel also controls the load/unload arms, and the rollers in the deck for rotating the pipe.

In other embodiments welders, needle scalers, rotary impact flapper, abrasive disk, rotary brushes, or other tools may be fitted to the tool mount. In another embodiment the tools may be swappable, or multiple tool mounts may be provided for multiple operations. In one embodiment, the tool mount may be angled, positioned, and pressure adjusted for a controlled interaction with the pipe materials.

In one embodiment these adjustments are manually performed by an operator. In another embodiment the adjustments are mechanically controlled by the operator. In another embodiment the adjustments are computer controlled in response to sensors or in accordance with preset values and are supervised by the operator.

DETAILED DESCRIPTION OF THE DRAWINGS

FIG. 1 illustrates the flow of line pipe production process. Production of line pipe (1000) begins with feeding iron ore and/or scrap materials along with alloying elements (1810) into a furnace (1240). The materials form steel (1820) and are cast (1250), cooled (1260) and cut (1270) into billets (1830).

The billets (1830) are heated (1310), pierced (1320), rolled and sized (1330), then allowed to cool (1340). These activities covert billets (1830) into raw pipe stock (1840). The pipe stock (1840) is straightened (1350) before EMI testing (1710) to identify plate lamination discontinuity, spalling, cracking, or other defects affecting pipe quality.

The pipe stock (1840) which fails (1785) EMI testing (1710) is designated as recycle (1790). Pipe stock (1840) which passes (1780) EMI testing (1710) continues to the saws (1360) to be cut to length and stored. Ends and remnants are scrapped (1790). Pipe stock (1840) is hardened (1410), quenched (1420) and tempered (1430).

Thermal processes (1410-1430) can cause bowing and warping of the pipe stock (1840). Therefore, the pipe stock (1840) is again straightened (1440) prior to EMI testing (1710) and ultrasonic testing (1715). Any pipe stock (1840) failing (1785) test is recycled (1790), while passing (1780) pipe stock (1840) is collected for finishing.

Since line pipe has higher standards than other pipe or if moved to a different process line, the pipe stock (1840) may be tested again (1710) when entering the finishing processes. Materials that fail testing (1785) may be recycled (1790) or designated for different finishing processes. Pipe stock (1840) passing (1780) testing (1710) is threaded (1510) to form a pin end and/or undergoes coupling make-up (1520) to form a box end as designated by the customer's order.

Pipe stock (1840) passing EMI testing (1710), MPI testing (1730), drift testing (1740), and hydrostatic testing (1750) is then given a temporary rust inhibiting coating (1610). The pipe is then bundled (1620) and stored or shipped to a coating facility. Though one skilled in the arts would appreciate that all processes may be performed at a single facility and may immediately follow one another making the temporary rust inhibiting coating (1610) and bundling (1620) unnecessary.

One skilled in the arts would appreciate that specific manufacturing processes may vary between facilities or between products being produced. This variance may be as to the processes performed, order of performance, and/or testing procedures, etc. Further, some processes such as tempering, threading, temporary coating, etc. may be eliminated, or other processes added.

Figure 2:
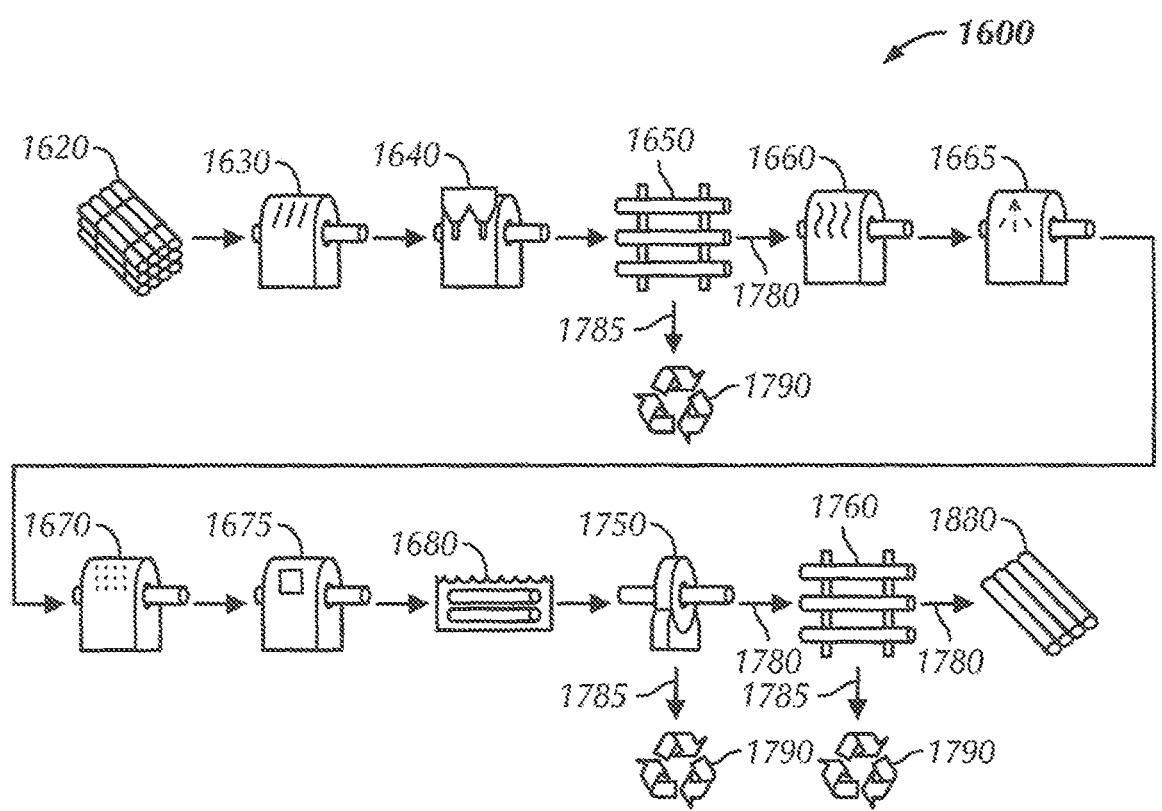
FIG. 2 illustrates an exemplary line pipe finishing process.

FIG. 2 illustrates an exemplary line pipe finishing process. The finishing process (1600) illustrated is conducted at a different facility from the production process from FIG. 1. The line pipe is received in a bundle (1620) with a temporary rust inhibiting coating that must be stripped (1630).

Once temporary coatings are stripped (1630), line pipe is abrasive blasted (1640) to remove mill scale, rust, dirt, oils, etc. The cleaned pipe is inspected (1650) for quality and cleanliness. Pipe failing (1785) inspection is recycled (1790).

A three-layer coating typically used for line pipe requires pre-heating (1660) before receiving an epoxy spray (1665), before spiral wrapping an adhesive (1670), and a polyethylene (1675) outer coat. The coated pipe is cooled (1680), mechanically tested (1750), and visually inspected (1760) before becoming designated as final product (1880).

Figure 3:
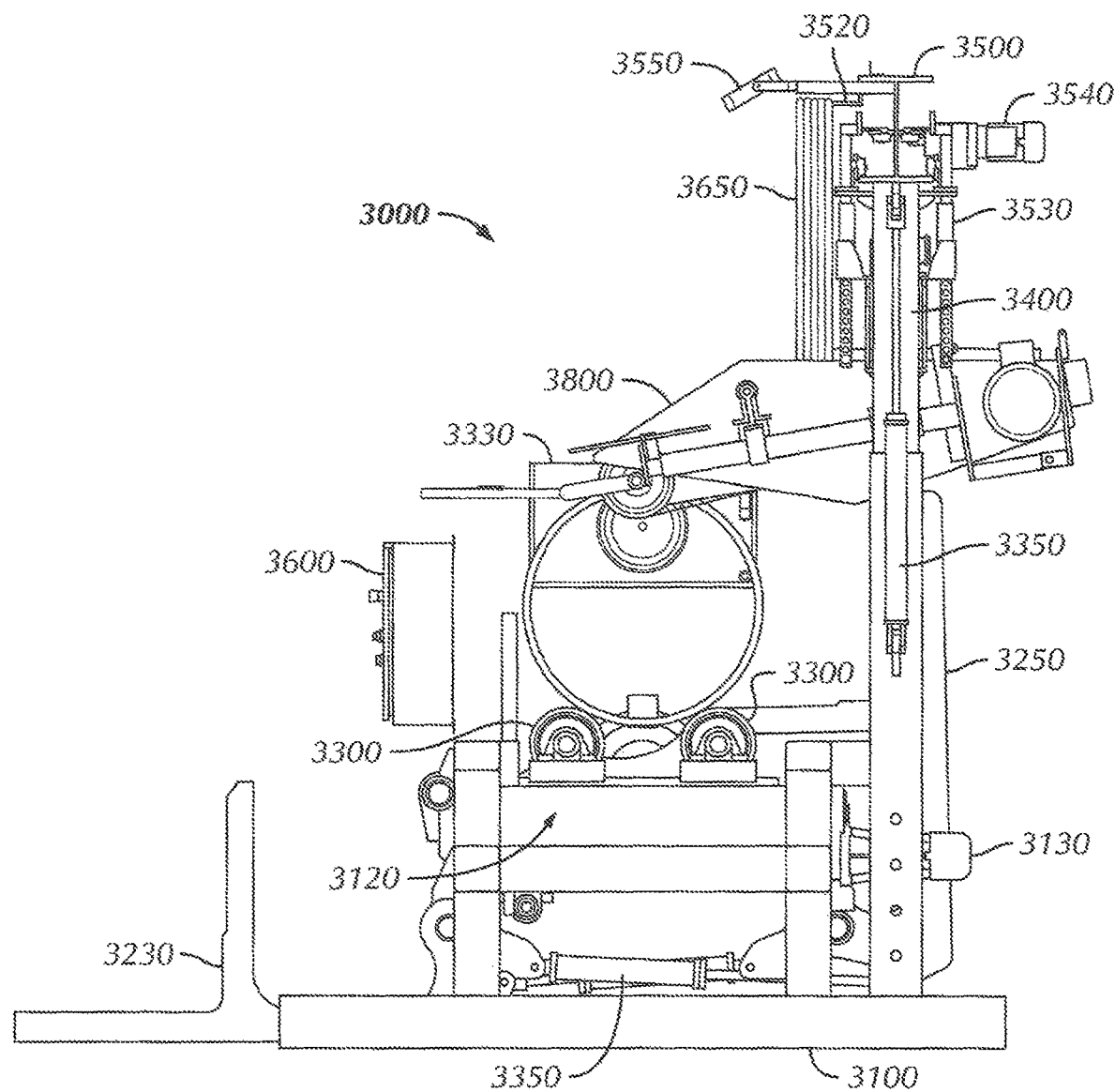
FIG. 3 is an end view of a pipe station in accordance with an exemplary embodiment of the invention.
Figure 4:
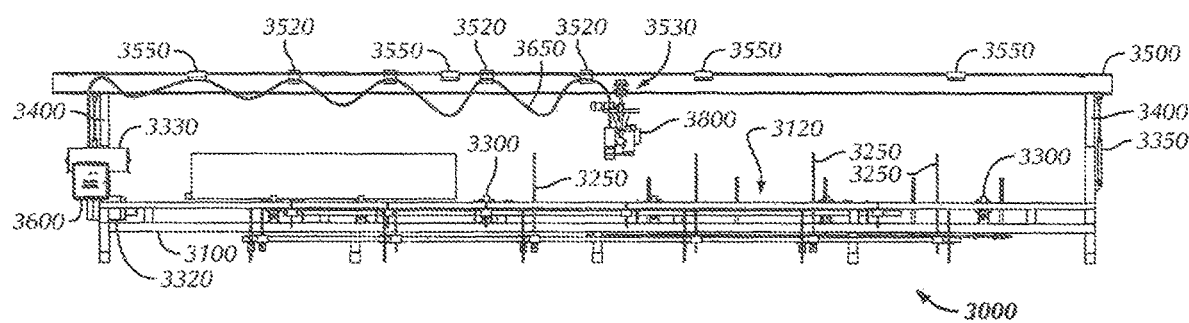
FIG. 4 is a top view of the same pipe station of FIG. 3 and is in accordance with an exemplary embodiment of the invention.
Figure 5:
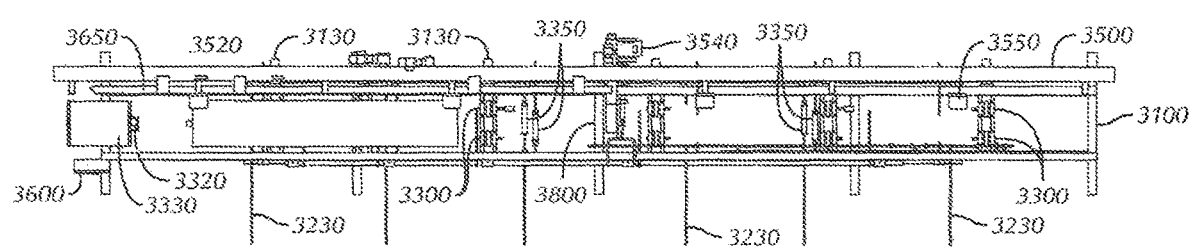
FIG. 5 is a front view of the same pipe station of FIG. 3 and is in accordance with an exemplary embodiment of the invention.

FIGS. 3-5 are orthographic projections of a pipe station in accordance with an exemplary embodiment of the invention. FIG. 3 is an end view, FIG. 4 is a top view, and FIG. 5 is a front view of the same pipe station in accordance with an exemplary embodiment of the invention. The drawings depict an exemplary embodiment of a mobile pipe resurfacing and inspection workstation, i.e. a pipe station.(3000).

The frame (3100) of the pipe station (3000) has jack screws (3130) to raise or lower the deck (3120) to the working height, which may be for interface/accommodation of surrounding equipment, leveling on uneven surfaces, or just for operator comfort. In other embodiment the frame may have wheels (powered/unpowered, steerable/fixed) for positioning. In such an embodiment, the jack screws (3130) also serve to lift the frame off the wheels fixing it in place to prevent unintended movement.

The deck (3120) of the pipe station (3000) has rollers (3300) driven by a motor (3320), here an electric motor, able to rotate the pipe material (not labeled) to specific positions or to rotate the pipe material continuously at varying speeds based on the needs and desires of the operator. All mechanical action described may be accomplished by electric, pneumatic, or hydraulic forces, the details of which are beyond the scope of this description, but should be apparent to one skilled in the art.

The pipe station (3000) has loading arms (3230 & 3250) for loading and unloading long and/or large pipe materials to the deck (3120). The loading arms (3230 & 3250) in this embodiment are hydraulically operated by pistons (3350) using an included hydraulic system (3330). Loading arms (3230 & 3250) can be raised to allow transportation along most roadways without special permitting or escorting by the reduce the width of the pipe station (3000).

The hydraulic system (3330) in this embodiment also operates pistons (3350) on each of the risers (3400) to raise or lower the gantry (3500). With the gantry (3500) in the lower position the trailered pipe station (3000) will clear most bridges and overhead obstructions of typical roadways. With the gantry (3500) in the raised position the pipe station (3000) will handle pipe material (not labeled) over thirty inches in diameter (up to 35 inches for the preferred embodiment).

The gantry (3500) supports a tool mount (3530) and cables/hoses (3650) with movable cable management cleats (3520) to power/enable a tool (3800) mounted there on. The tool mount (3530) may be rotated side to side to adjust the angle of interface between the tool (3800) and the pipe material.

The tool mount (3530) is movable along the length of the gantry (3500) to access the full length of pipe material on the deck (3120). In one embodiment the operator may move the tool mount (3530) manually. In the embodiment illustrated the movement may be controlled by the operator mechanically, on-demand, and/or auto-paced by the controller motor (3540).

The tool mount (3530) is adjustable vertically to vary the interaction or contact between the tool and the pipe material on the deck (3120). Examples include, but are not limited to, varying distance of a sprayer nozzle to adjust coverage; maintaining a set clearance to ensure consistent results from testing equipment. In addition to a specific vertical positioning, the tool mount (3530) may have a measured downward force applied to the tool urging it against the pipe material with a desired pressure.

Overhead Lights (3550) are mounted to the gantry (3500) ensuring sufficient illumination for visual inspections and other operator tasks along the entire length of the deck (3120). In other embodiments lights on the lower portions of the frame (3100) can also illuminate work from below. A control panel (3600) located at one end of the pipe station (3000) controls most actions, particularly operation of loading arms (3230) and unloading arms (3250) the operator must control from a safe location.

The flow diagrams in accordance with exemplary embodiments of the present invention are provided as examples and should not be construed to limit other embodiments within the scope of the invention. For instance, the actions should not be construed as steps that must proceed in a particular order. Additional steps may be added, some steps removed, or the order of the steps altered and still be within the scope of the invention.

Further, steps within different figures can be added to or exchanged with other steps in the same or other figures. Further yet, specific numerical data values (such as specific quantities, numbers, categories, etc.) or other specific information should be interpreted as illustrative for discussing exemplary embodiments. Such specific information is not provided to limit the invention.

The diagrams in accordance with exemplary embodiments of the present invention are provided as examples and should not be construed to limit other embodiments within the scope of the invention. For instance, heights, widths, and thicknesses may not be to scale and should not be construed to limit the invention to the particular proportions illustrated.

Additionally, some elements illustrated in the singularity may actually be implemented in a plurality. Further, some element illustrated in the plurality could actually vary in count. Further, some elements illustrated in one form could actually vary in detail. Further yet, specific numerical data values (such as specific quantities, numbers, categories, etc.) or other specific information should be interpreted as illustrative for discussing exemplary embodiments. Such specific information is not provided to limit the invention.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A pipe station comprising:
   a cubic longitudinal frame,
   a deck traversing the top surface of the frame,
   a pair of risers mounted to distal ends of the frame, and
   a gantry extending the length of the frame supported by the pair of risers,
   wherein the gantry further comprises:
      a tool mount positionable along the length of the gantry; and
      cable management to support a tool mounted to the tool mount.

2. The pipe station described in claim 1 wherein the deck further comprises a plurality of parallel rows of rollers.

3. The pipe station described in claim 1 wherein the deck further comprises a plurality of lights for illuminating the underside an item positioned on the deck.

4. The pipe station described in claim 1 wherein the frame further comprises loader/unloader arms along at least one of the sides.

5. The pipe station described in claim 4 wherein the arms are powered.

6. The pipe station described in claim 1 wherein the risers are slidably retractable to vertically position the gantry.

7. The pipe station described in claim 6 wherein the risers are powered to mechanically extend or retract the gantry.

8. The pipe station described in claim 2 wherein a motor is configured to rotate at least a portion of the rollers.

9. The pipe station described in claim 2 wherein the outer surface of the rollers comprises an anti-slip texturing finish or surface coating.

10. The pipe station described in claim 2 wherein the outer surface of the rollers comprises a metallic surface.

11. The pipe station described in claim 2 wherein a motor is configured to position the tool mount along the gantry.

12. The pipe station described in claim 2 wherein the tool is removably mounted to the tool mount.

13. The pipe station described in claim 12 wherein the gantry further comprises a plurality of cables to support the tool mounted to the tool mount.

14. The pipe station described in claim 12 wherein the gantry further comprises a plurality of lights for illuminating the deck.

15. The pipe station described in claim 12 wherein the tool mount is pivotally positionable to support the tool at different angles to the deck.

16. The pipe station described in claim 12 wherein the tool mount is
   vertically adjustable and
   regulated to urge the tool downward toward the deck.

17. The pipe station described in claim 12 wherein the tool comprises one or more of:
   a belt sander,
   a grinder,
   a welder,
   a sprayer,
   a pressure washer,
   an abrasive blaster,
   an ultrasonic tester,
   an acoustic tester,
   an electromagnetic tester,
   an electrical conduction tester, and
   a printer.

18. The pipe station described in claim 1 further comprising a control panel controlling one or more:
   electrical systems,
   hydraulic systems,
   pneumatic systems, and
   computer systems.

19. The pipe station described in claim 18 wherein the computer systems are configured to:
   run pre-programmed automated operations,
   monitor and record instrument readings,
   adapt pre-programmed operations based on instrument readings,
   accept and execute remote commands, and
   accept and respond to remote queries.

* * * * *